United States Patent [19]

Waguespack, Jr.

[11] Patent Number: 5,025,646

[45] Date of Patent: Jun. 25, 1991

[54] STEERING WHEEL LOCK APPARATUS

[76] Inventor: Arthur A. Waguespack, Jr., 14 Sombrero La., St. Rose, La. 70087

[21] Appl. No.: 615,310

[22] Filed: Nov. 19, 1990

[51] Int. Cl.$^5$ .............................................. B60R 25/02
[52] U.S. Cl. ...................................... 70/209; 70/226; 70/237
[58] Field of Search ................. 70/237, 238, 209, 211, 70/212, 210, 225, 226

[56] References Cited

U.S. PATENT DOCUMENTS

| | | | |
|---|---|---|---|
| 1,090,625 | 3/1914 | Keffer | 70/211 |
| 1,140,141 | 5/1915 | Fagan | 70/211 |
| 1,296,085 | 3/1919 | Johnson | 70/211 |
| 3,690,131 | 9/1972 | Davis | 70/212 X |
| 4,134,282 | 1/1979 | Callahan | 70/237 X |
| 4,882,920 | 11/1989 | Wu | 70/209 |
| 4,974,433 | 12/1990 | Wang | 70/211 |
| 4,982,810 | 1/1991 | Toy | 70/237 X |

FOREIGN PATENT DOCUMENTS

| | | | |
|---|---|---|---|
| 462281 | 7/1928 | Fed. Rep. of Germany | 70/211 |
| 148683 | 8/1920 | United Kingdom | 70/212 |

Primary Examiner—Lloyd A. Gall
Attorney, Agent, or Firm—Pravel, Gambrell, Hewitt, Kimball & Krieger

[57] ABSTRACT

An apparatus which is attachable at a first end to the upper portion of an automobile steering wheel, and an second end which rests upon the dashboard of the automobile. The apparatus further includes an extended body member extending between the steering wheel and the dashboard. At one end of the body member there is defined a U-shaped section into which an upper member of the steering wheel is engaged, so that a standard padlock can be positioned between the end of the U-shaped section extending past the steering column and through the member of the body member so that the steering column is engaged therewithin. On the face of the U-shaped section there is included a first transverse body member extending across the upper stance of the steering column with each end of the body member engaging a portion of the column approximately thirty (30°) to forty-five (45°) in radial diameter. On the second end of the principal body portion there is included a second transverse body member resting upon the dashboard, along its length. When in position, the apparatus function to serve as a means for preventing the rotation of the steering column with the relationship of the first and second transverse body member serving to prevent the rotation of the column as the body members make contact along their length with the forward face of the steering column and the upper face of the dashboard, thus resisting the turning of the steering wheel.

5 Claims, 2 Drawing Sheets

STEERING WHEEL LOCK APPARATUS

BACKGROUND OF THE INVENTION

1. Field of The Invention

The apparatus of the present invention relates to security in vehicles. More particularly, the present invention relates to an apparatus mountable to the steering wheel of a powered vehicle, and which functions in relationship to the dashboard for preventing the turning of the steering wheel for maintaining the steering wheel inoperable while the apparatus is locked into position.

2. General Background

In the art of rendering a powered vehicle such as an automobile or the like secure from theft, many attempts have been made to accomplish this end. Other than the standard door locks on powered vehicles, in recent times, for the most part, vehicles have been further secured with a mechanical lock within the steering column of the automobile, so that when key of the automobile is removed, the steering wheel is locked into position and cannot be turned.

However, the mechanisms for accomplishing this end are somewhat fragile, and a thief, once he has gained entry into the automobile, quite easily is able to pry his way into the mechanism, and render it ineffective. Thus, he is able to operate the steering once the automobile has been "hot-wired", and it can be driven away.

Therefore, there is a need in securing automobiles to provide a mechanism or means for assuring that an automobile is rendered undrivable after the owner has left the automobile. One of the areas which has been found to be promising is to render the steering wheel inoperable, with the use of an apparatus other than the internal locking mechanism previously described. There have been several patents in the field which address the securing of automobiles, the most pertinent being as follows:

| PATENT NO. | PATENTEE | TITLE |
| --- | --- | --- |
| 3,190,090 | Zaidener | "Anti-Theft Device For Road Vehicles" |
| 3,348,391 | Barnwell | "Steering Wheel Lock For Automobiles" |
| 3,828,593 | Bolton | "Anti-Theft Device For Vehicles" |
| 4,103,524 | Mitchell | "Theftproof Steering Wheel Lock" |
| 4,134,282 | Callahan | "Motor Vehicle Anti-Theft Device" |
| 4,304,110 | Fain | "Steering Wheel Lock Bar" |
| 4,444,030 | Dausch | "Device For Theft-Proving Vehicles" |
| 4,738,127 | Johnson | "Automobile Steering Lock" |
| 4,829,797 | Wu | "Steering Wheel Lock" |
| 4,882,920 | Wu | "Steering Lock For Automobile" |

SUMMARY OF THE PRESENT INVENTION

The apparatus of the present invention solves the shortcomings in the art in a simple and straightforward manner. What is provided is an apparatus which is attachable at a first end to the upper portion of a automobile steering wheel, and the second end which rests upon the dashboard of the automobile. The apparatus further includes an extended body member extending between the steering wheel and the dashboard. At one end of the body member there is defined a U-shaped portion into which an upper portion of the steering wheel is engaged, so that a standard pad-lock can be positioned between the end of the U-shaped portion extending past the steering column and through the portion of the body member so that the steering column is engaged therewithin. On the face of the U-shaped portion there is included a first transverse body member extending across the upper curve of the steering wheel, with each end of the body member engaging a portion of the wheel approximately thirty (30°) to forty-five (45°) in radial diameter.

On the second end of the principal body portion there is included a second transverse body member resting upon the dashboard, along its length. When in position, the apparatus functions to serve as a means for preventing the rotation of the steering column through the relationship of the first and second transverse body members, the first body member serving to prevent the rotation of the steering wheel as the body member makes contact along its length with the upper face of the dashboard, thus resisting the turning of the steering wheel, and the second body member prevents the lifting of the first body member away from the dashboard.

Therefore, it is a principal object of the present invention to provide an apparatus which is easily attachable and removable from a vehicle steering wheel, but prevents the steering wheel from being turned when the apparatus is in place;

It is a further object of the present invention to provide an apparatus which can be stored away when not in use, yet is easily positioned between the steering wheel and the dashboard of a vehicle in order to prevent the turning of the steering wheel when the apparatus is locked in place; and It is a further object of the present invention to provide an apparatus for preventing the turning of a steering wheel, the apparatus locked in place by providing resistance against the turning of the wheel by a first transverse body member, and for preventing the lifting of the first transverse body member away from the dashboard by a second body member making contact with the surface of the steering wheel.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

Figure 5:
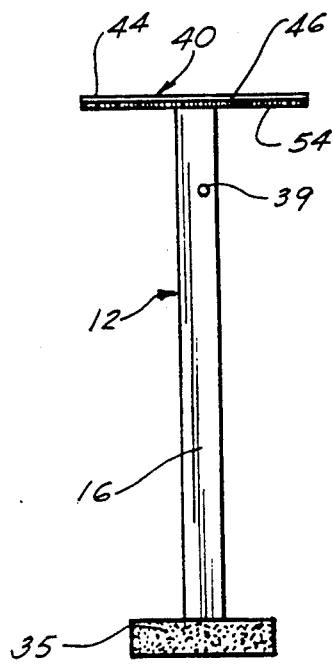
FIGS. 4 and 5 illustrate top and bottom views respectively of the apparatus of the present invention.
Figure 4:
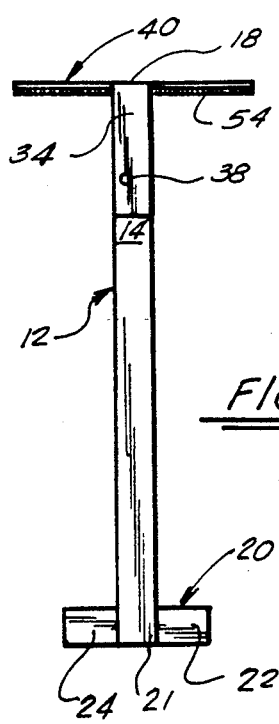
Figure 6:
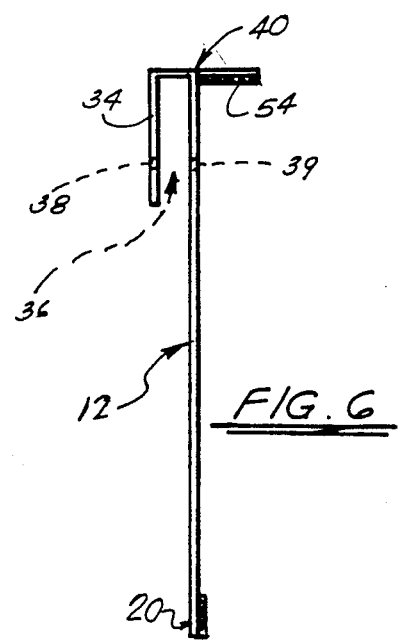
FIG. 6 illustrates a side view of the apparatus of the present invention.

The preferred embodiment of the apparatus of the present invention is illustrated by the numeral 10. As illustrated, steering lock apparatus 10 comprises in principal portion an extended body portion 12 which is constructed of a flat metal bar having an upper surface 14, a lower surface 16, the principal body portion 12 substantially the length of the distance between a typical vehicle steering wheel and the dashboard of the vehicle for the reasons which will be described further. As seen in FIG. 3, principal body portion 12 further comprises a first end portion 21 extending outward for resting on the dashboard. A first transverse body member 20 is secured to the lower face 16 thereof, via welding or the like, and likewise comprises a portion of flat metal plate, with the attachment between the principal body portion 12 and first transverse body portion 20 being substantially along the center line of the body portion 20, so that the body portion 20 is defined as a pair of arm members 22, 24 extending transversely from Further, on its second end 18 principal body portion 12 terminates in a U-shaped steering wheel receiving means 30 formed by a first upwardly depending portion 32, and an upper end portion 34, extending back from the principal body portion for defining a U-shaped receiving chamber 36 therein. As illustrated, upper end portion 34 is provided with a port 38 through which the leg of a standard pad-lock is slid therethrough, with a corresponding port 39 (see FIG. 5), in the principal body portion, so that the leg of the lock can be slid through both ports to close off U-shaped receiving face 30 when the lock is in place. (See FIG. 2)

As is further illustrated, apparatus 10 further comprises a second transverse body member 40 attached to the second end 18 of principal body portion 12, via welding or the like, along its upper edge 42, as illustrated in the Figures, with the securing of the principal body portion 12 to the second transverse body portion 40, substantially along the center line of body portion 40 so that there is defined first and second leg members 44, 46 extending outwardly from both sides of the principal body portion the function of which will be described further.

Figure 1:
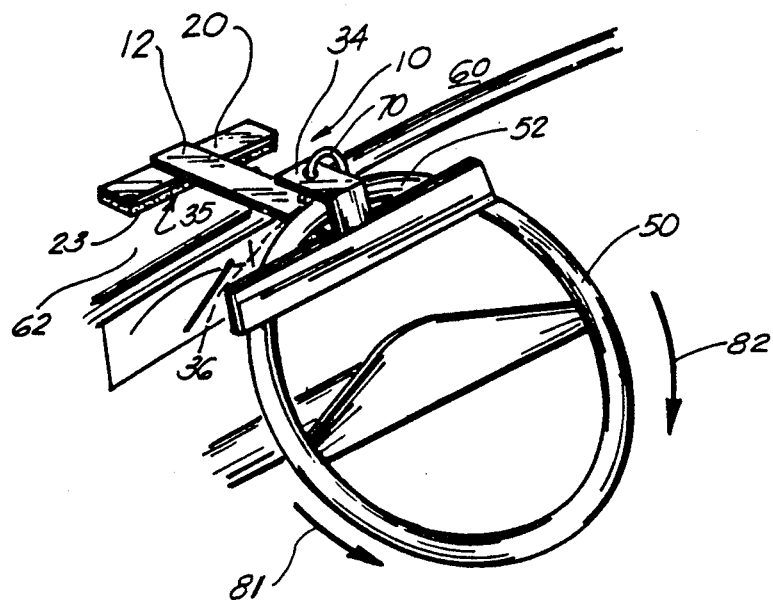
FIG. 1 illustrates an overall perspective view of the apparatus of the present invention locked in position.
Figure 2:
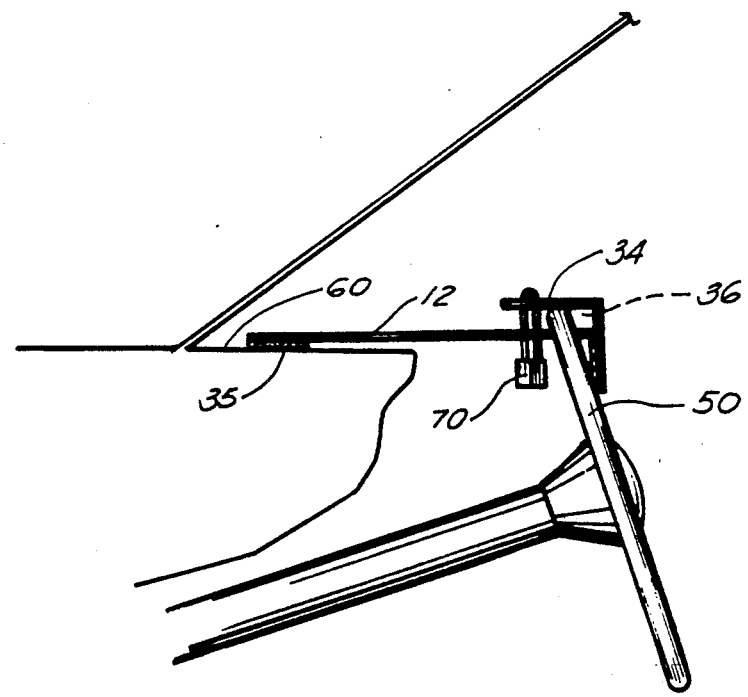
FIG. 2 illustrates an overall side view of the preferred embodiment of the apparatus of the present invention locked in position.
Figure 3:
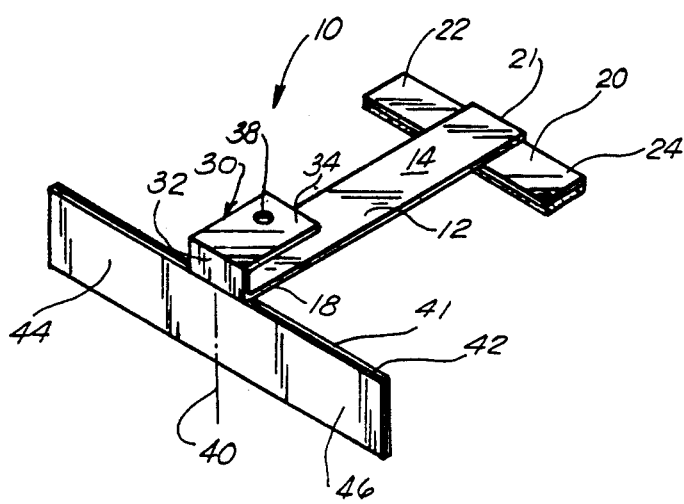
FIG. 3 illustrates an overall perspective view of the apparatus of the present invention.

Turning now to the operation of the apparatus, reference is made to FIGS. 1 and 2. As illustrated in FIGS. 1 and 2, apparatus 10 has been placed into position between a steering wheel 50 of a standard vehicle such an automobile or other type of powered vehicle, to the dashboard 60 of the vehicle. As was stated earlier, the length of body portion 12 is of such a length so that it is of sufficient length to extend illustrated, when in position, first transverse body member 20 is resting on its lower face 23 from the upper surface 62 of dashboard 60. So that there is no marring of the surface of dashboard 60, transverse body member 20 includes a soft padded material 35 secured along its under surface 23 with gluing or the like, so that there is no contact between the metallic body member 20 and the upper surface 62 of dashboard 60.

As further illustrated, the upper portion 52 of steering wheel 50 is secured within U-receiving space 36, with the U-spaced 36 accommodating the entire diameter of the steering wheel 50, so that a pad-lock 70, as seen more clearly in FIG. 2, can be positioned through ports of 38, 39, and house the upper portion 52 of steering wheel 50 in position so that apparatus 10 cannot be removed from steering wheel 60.

Further, when steering wheel 50 is locked into position as seen in FIGS. 1 and 2, second transverse body portion 40 spans across a substantially thirty (30°) to forty-five (45°) radial curvature of the upper portion 52 of steering wheel 50, with the underside 41 of the body member 40 resting against the flat face of steering wheel 50. Likewise, as with transverse body member 20, to prevent marring of the surface of the steering wheel, a padded material 54 is secured through gluing or the like to the undersurface of body member 40.

As seen in the Figures, when the apparatus is locked in place, particularly in FIG. 1, should there be an attempt to turn the steering wheel 50, either in the direction of Arrows 81 or 82, it is clearly seen that first transverse body member 20 would likewise have to accomplished since the leg portions 22 and 24 of the body member 20 would resist turning by making contact with the surface of the dashboard 60. Were one to attempt to lift the body member 20 away from the dashboard 60 in order to accomplish the turning, second transverse body portion 40 would prevent such lifting, since it would make contact with the forward face of the steering wheel 50, and lifting could not be accomplished. Therefore, as seen in FIGS. 1 and 2, the apparatus 10 is secured firmly in relationship between the steering wheel 50 and the dashboard 60, and any attempts to turn the steering wheel would be futile, and any attempts to move the apparatus out of the position as seen in FIG. 1, would be futile, as long as pad-lock 70 is in position.

Therefore, apparatus 10 serves as a "fail-safe" means for preventing the turning of the steering wheel, and thus any attempts of stealing a vehicle with the apparatus in place would be practical impossible, and would result in failure.

For purposes of construction, apparatus 10 would be constructed of a light-weight yet durable metal, and as was stated earlier, could be easily stored out of sight when the automobile is being utilized, and is easily slid into the position as seen in FIGS. 1 and 2, and locked in place while the automobile is not in use.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An apparatus for preventing the turning of a steering wheel of a powered vehicle, comprising:
    a) a principal body portion extending substantially between an upper portion of the steering wheel of the vehicle and an upper face of a dashboard of the vehicle;
    b) a first transverse body member secured to a first end of the principal body portion and resting on the dashboard;
    c) means for receiving a portion of the steering wheel in locked engagement with a second end of the principal body portion; and
    d) a second transverse body member secured to the second end of the principal body portion, making contact with a portion of the steering wheel so that any attempt to turn the steering wheel is resisted by the position of the first transverse body member, and any attempt to lift the apparatus out of position is resisted by the second transverse body member in relation to the steering wheel.

2. The apparatus of claim 1, wherein there is further provided a pad-lock engaging the steering wheel locked in position with the apparatus.

3. The apparatus in claim 1, wherein the steering wheel is slidably engaged into a U-shaped receiving space into which the pad-lock is secured therein.

4. The apparatus in claim 1, wherein there is further provided a cushion on a lower face at the first and second transverse body members so that the dashboard and the steering column are not marred by metal contact with the apparatus.

5. The apparatus in claim 1, wherein the first transverse body member resists turning of the steering wheel as defined by a pair of arm members extending outward from the principal body portion.

* * * * *